US009319103B2

(12) United States Patent
Burton et al.

(10) Patent No.: US 9,319,103 B2
(45) Date of Patent: *Apr. 19, 2016

(54) APPARATUS, SYSTEMS AND METHODS FOR POWER LINE CARRIER DATA COMMUNICATION TO DC POWERED ELECTRONIC DEVICE

(71) Applicant: EchoStar UK Holdings Limited, Steeton, Keighley (GB)

(72) Inventors: David Robert Burton, Skipton (GB); Martyn Ward, Bingley (GB)

(73) Assignee: EchoStar UK Holdings Limited, Steeton (GB)

( * ) Notice: Subject to any disclaimer, the term of this patent is extended or adjusted under 35 U.S.C. 154(b) by 57 days.

This patent is subject to a terminal disclaimer.

(21) Appl. No.: 14/466,542

(22) Filed: Aug. 22, 2014

(65) Prior Publication Data
US 2014/0361880 A1 Dec. 11, 2014

Related U.S. Application Data

(63) Continuation of application No. 14/163,986, filed on Jan. 24, 2014, now Pat. No. 8,830,040, which is a continuation of application No. 13/074,736, filed on Mar. 29, 2011, now Pat. No. 8,638,199.

(51) Int. Cl.
*G08C 19/16* (2006.01)
*H04B 3/54* (2006.01)
(Continued)

(52) U.S. Cl.
CPC ....... *H04B 3/54* (2013.01); *G08C 19/00* (2013.01); *H02J 13/0003* (2013.01); *H04B 2203/547* (2013.01)

(58) Field of Classification Search
CPC ..... G08C 19/00; G08C 19/12; H02J 13/0003; H04B 2203/547; H04B 3/54; H04B 3/542; H04B 2203/5441; H04B 2203/5445; H04B 3/56; A63H 30/04; E05F 15/2076; G01R 23/005; G01R 23/06
USPC ............... 340/13.23, 12.32, 13.37, 12.4, 5.61
See application file for complete search history.

(56) References Cited

U.S. PATENT DOCUMENTS

| 3,783,183 A | * | 1/1974 | Giebler | ................ H04L 12/00 178/3 |
| 5,296,739 A | | 3/1994 | Heilbronner et al. | |

(Continued)

FOREIGN PATENT DOCUMENTS

| EP | 1351409 | 10/2003 |
| EP | 1603250 | 12/2005 |

(Continued)

OTHER PUBLICATIONS

PiezoFans, LLC—Piezo Fans and Piezoelectric Technology, "Advanced Micro-Cooling Systems" Product Description, http://piezofans.com/, download date Mar. 4, 2011, 2 pages.

*Primary Examiner* — Omer S Khan
(74) *Attorney, Agent, or Firm* — Lowe Graham Jones PLLC

(57) ABSTRACT

Systems and methods are operable to communicate information to a direct current (DC) powered electronic device. An exemplary embodiment receives alternating current (AC) power with an AC information signal modulated thereon, converts the received AC power to DC power, demodulates the received AC information signal to determine information, modulates the information onto the transmitted DC power as a DC information signal, transmits the DC power with the DC information signal over a DC connector to the DC powered electronic device, detects the DC information signal on the modulated DC power at the DC powered electronic device, demodulates the DC information signal from the received DC power, and determines the information at the DC powered electronic device based upon the demodulated DC information.

17 Claims, 4 Drawing Sheets

(51) Int. Cl.
*H02J 13/00* (2006.01)
*G08C 19/00* (2006.01)

(56) References Cited

U.S. PATENT DOCUMENTS

| | | | |
|---|---|---|---|
| 5,652,755 A * | 7/1997 | Carey | H04B 3/548 340/538 |
| 5,911,582 A | 6/1999 | Redford et al. | |
| 5,921,757 A | 7/1999 | Tsutsui et al. | |
| 6,128,194 A | 10/2000 | Francis | |
| 6,212,074 B1 | 4/2001 | Gonsalves et al. | |
| 6,219,236 B1 | 4/2001 | Hirano et al. | |
| 6,567,023 B1 * | 5/2003 | Iwata | G06F 1/22 326/60 |
| 6,577,504 B1 | 6/2003 | Lofland et al. | |
| 6,665,187 B1 | 12/2003 | Alcoe et al. | |
| 6,818,276 B2 | 11/2004 | Bourdelais et al. | |
| 6,946,856 B1 | 9/2005 | Tellkamp | |
| 6,982,877 B2 | 1/2006 | Vinson et al. | |
| 7,236,368 B2 | 6/2007 | Maxwell et al. | |
| 7,310,233 B2 | 12/2007 | Bell | |
| 7,312,534 B2 | 12/2007 | delos Santos et al. | |
| 7,345,885 B2 | 3/2008 | Bourdreaux et al. | |
| 7,550,825 B2 | 6/2009 | Santos et al. | |
| 7,629,400 B2 | 12/2009 | Hyman | |
| 7,742,299 B2 | 6/2010 | Sauciuc et al. | |
| 7,893,897 B2 * | 2/2011 | Chung | G09G 3/2011 315/169.3 |
| 7,923,855 B2 * | 4/2011 | Biegert | H04B 3/542 307/1 |
| 2002/0080010 A1 * | 6/2002 | Zhang | H04B 3/542 375/257 |
| 2003/0185027 A1 | 10/2003 | Yokoo et al. | |
| 2005/0008832 A1 | 1/2005 | Santos et al. | |
| 2005/0266295 A1 | 12/2005 | Takai | |
| 2007/0222421 A1 * | 9/2007 | Labuschagne | G05F 1/12 323/255 |
| 2007/0278683 A1 | 12/2007 | Santos et al. | |
| 2008/0135216 A1 | 6/2008 | Zhang et al. | |
| 2009/0299532 A1 * | 12/2009 | Zyren | H04B 3/546 700/276 |
| 2010/0213759 A1 | 8/2010 | Covaro | |
| 2010/0261386 A1 | 10/2010 | Blum et al. | |
| 2011/0248835 A1 * | 10/2011 | Speegle | G08C 19/02 340/12.32 |

FOREIGN PATENT DOCUMENTS

| | | |
|---|---|---|
| WO | 03/107427 | 12/2003 |
| WO | 2009/058149 | 5/2009 |

\* cited by examiner

APPARATUS, SYSTEMS AND METHODS FOR POWER LINE CARRIER DATA COMMUNICATION TO DC POWERED ELECTRONIC DEVICE

PRIORITY CLAIM

This patent application is a Continuation of U.S. Non-Provisional patent application Ser. No. 14/163,986, filed Jan. 24, 2014, published as U.S. Publication No. 2014/0139326, entitled "APPARATUS, SYSTEMS AND METHODS FOR POWER LINE CARRIER DATA COMMUNICATION TO DC POWERED ELECTRONIC DEVICE," and issued as U.S. Pat. No. 8,830,040 on Sep. 9, 2014; which is a Continuation of U.S. Non-Provisional patent application Ser. No. 13/074,736, filed Mar. 29, 2011, published as U.S. Publication No. 2012/0249309, entitled "APPARATUS, SYSTEMS AND METHODS FOR POWER LINE CARRIER DATA COMMUNICATION TO DC POWERED ELECTRONIC DEVICE," and issued as U.S. Pat. No. 8,638,199 on Jan. 28, 2014, the contents of which are herein incorporated by reference in their entireties.

BACKGROUND

Media devices, such as a set top box, a stereo, a television, a computer system, a game system, or the like are configured to receive media content. The media content may be received at the media device from a variety of sources. For example, the media device may be communicatively coupled to a media content provider system, such as a satellite system, a cable system, a fiber optic system, an over the air (OTA) system, and/or the Internet. The received media content is communicated to a presentation device having a display and/or speakers. The video portion of the media content is presented on the display and the audio portion of the media content is reproduced as sounds by the speakers.

Power for operation of the media device is provided by an alternating current (AC) power supply that is transmitted through the customer premises by a power wiring network. The customer premises AC power wiring network includes a plurality of power receptacles distributed across the customer premises at convenient locations. A connector with a mating plug is coupled to the power receptacle to receive the AC power.

In some situations, data may be communicated from the media device to other client electronic client media devices by modulating data onto the customer premises AC power wiring network, commonly known as communicating data over a power line carrier network. The electronic client media device, which is also "plugged into" the customer premises AC power wiring network for its power, detects and demodulates the communicated power line carrier data communicated on the voltage of the AC power delivered by the customer premises AC power wiring network. The communicated data may then be used for a variety of purposes. The electronic client media device may also communicate data back to the media device, or may communicate data destined for other electronic client media devices, by modulating the return data onto AC voltage of the AC power wiring network.

Other types of electronic devices located at the customer premises may also communicate over the customer premises AC power wiring network. For example, a variety of home appliances may communicate with each other using the customer premises AC power wiring network, where the AC voltage on the AC power wiring network is used as a data carrier upon which the communicated data is modulated thereon.

However, there is a trend in the industry to develop lower cost electronic devices, such as client media devices and/or home appliances. Low power direct current (DC) client media devices and/or home appliances, such as those that operate on a 12 volt DC power supply, are less expensive to manufacture. However, to effectively use data modulated onto the AC voltage of the AC power transmitted over the customer premises AC power wiring network, a demodulator device located at the power receptacle of the AC power wiring network is required to detect and demodulate the communicated data detected on the voltage of the AC power. The communicated data is then provided from the demodulator to the various components of the client media device or home appliance via a separate data line, such as a universal serial bus (USB) cable, an Ethernet connector, or the like.

However, the separate data line and its associated components may constitute a significant cost. Accordingly, there is a need in the arts to further reduce costs by eliminating the need for the separate data line.

SUMMARY

Systems and methods of communicating information to a direct current (DC) powered electronic device are disclosed. An exemplary embodiment receives alternating current (AC) power with an AC information signal modulated thereon, converts the received AC power to DC power, demodulates the received AC information signal to determine information, modulates the information onto the transmitted DC power as a DC information signal, transmits the DC power with the DC information signal over a DC connector to the DC powered electronic device, detects the DC information signal on the modulated DC power at the DC powered electronic device, demodulates the DC information signal from the received DC power, and determines the information at the DC powered electronic device based upon the demodulated DC information.

BRIEF DESCRIPTION OF THE DRAWINGS

Preferred and alternative embodiments are described in detail below with reference to the following drawings.

DETAILED DESCRIPTION

Figure 1:
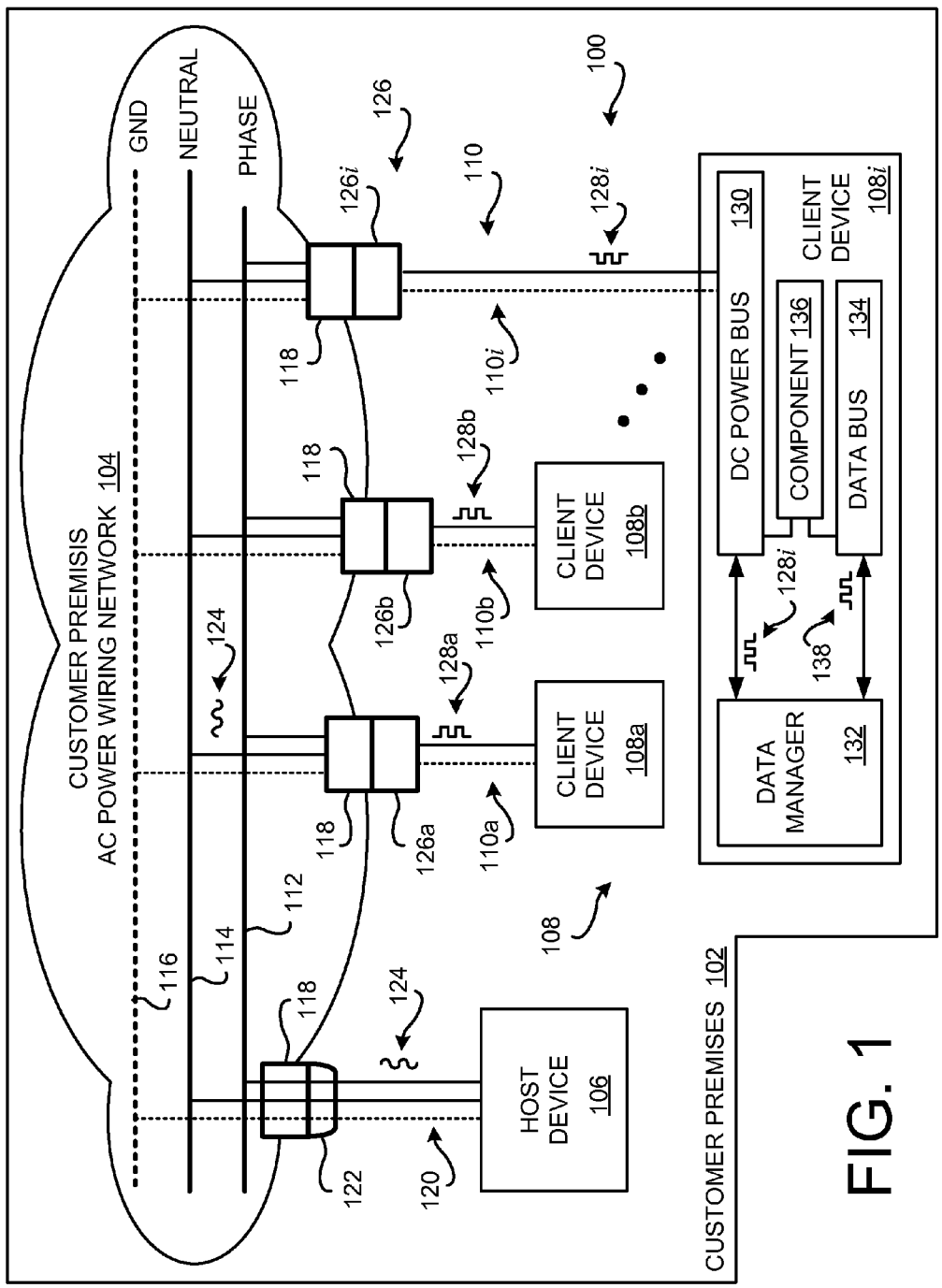
FIG. 1 is a block diagram of an embodiment of a direct current (DC) data communication system 100 implemented at a customer premises.

FIG. 1 is a block diagram of an embodiment of a direct current (DC) data communication system 100 implemented at a customer premises 102. The DC data communication system 100 is configured to communicate data over the customer premises alternating current (AC) power wiring network 104. In an exemplary embodiment, a host device 106 may communicate data to/from one or more DC powered electronic devices 108, hereinafter client devices 108, via the customer premises AC power wiring network 104, and via a DC connector 110 that couples the client device 108 to the customer premises AC power wiring network 104. Further, the client devices 108 may communicate with each other over their respective DC connectors 110 and the customer premises AC power wiring network 104.

The client devices 108 are configured to operate on DC power. The DC power is provided from the customer premises AC power wiring network 104 after a conversion of AC power into DC power. The DC power is transmitted to the DC powered electronic client devices 108 over the DC connectors 110.

The customer premises 102 corresponds to a location under the control of a customer, such as a residence, office, or other customer facility. The customer premises AC power wiring network 104 comprises a network of conductors suitable for distribution of power throughout the customer premises 102. Generally, the distributed AC power is received from a power supplier that provides the power from an AC distribution system (not shown). The AC distribution system employs a relatively high distribution AC voltage. A transformer (not shown) steps the higher distribution voltage down to a lower AC voltage that is provided to the customer premises AC power wiring network 104. The lower AC voltage is an operating voltage that various equipment located at the customer premises 102 have been designed to operate at. For example, 120 volt AC power may be received from the transformer for distribution across the customer premises AC power wiring network 104.

The exemplary customer premises AC power wiring network 104 comprises a phase conductor 112, a neutral conductor 114, and a ground conductor 116 that cooperatively distribute the 120 volt AC power. Other configurations and/or voltages, such as 240 volts, may be used for other types of customer premises AC power wiring networks 104.

A plurality of power receptacles 118, coupled to the customer premises AC power wiring network 104, are distributed throughout the customer premises 102 to provide convenient access to various electronic devices that are to be sourced from the 120 volt AC power provided by the customer premises AC power wiring network 104. For example, a host device 106 may have an AC power connector 120 with a mating plug 122. When the mating plug 122 is coupled to one of the power receptacles 118, the host device 106 will receive 120 volt AC power from the customer premises AC power wiring network 104.

In practice, the host device 106 modulates an AC information signal 124 onto the AC voltage on the customer premises AC power wiring network 104. The AC information signal 124 is detectable at the plurality of power receptacles 118.

One or more DC powered electronic client devices 108 may also be coupled to the customer premises AC power wiring network 104 via their respective DC connector 110. The client devices 108 are configured to operate using a DC voltage. The DC voltage is received from a receptacle connector 126 that is configured to convert the received AC voltage into a DC voltage that is used by the client devices 108. The receptacle connectors 126 are further configured to detect the AC information signal 124. The detected AC information signal 124 is demodulated by the receptacle connector 126 to determine the information of the AC voltage information signal 124. The determined information is then modulated onto the DC connector 110 as a DC information signal 128. The DC information signal 128 is then detectable at the client device 108.

For example, an exemplary client device 108i comprises a DC power bus 130, a data manager 132, a data bus 134, and a component 136. The DC power bus 130 is configured to receive DC power via the DC connector 110i. Modulated onto the DC voltage is the DC information signal 128i. The data manager 132 senses the DC voltage and demodulates the DC information signal 128i detected on the DC power bus 130 into demodulated data 138. (Alternatively, the data manager 132 may detect the DC voltage signal 128i on the DC connector 110 if the data manager 132 is directly coupled to the DC connector 110). The data manager 132 communicates the demodulated data 138 onto the data bus 134. The exemplary component 136 is configured to receive DC power from the DC power bus 130, and is configured to receive the demodulated data 138 from the data bus 134.

In some situations, the DC power client devices 108 may also be configured to transmit generated data via their respective DC connector 110. These client devices 108 are configured to modulate their data into a DC information signal 128. The generated DC information signal 128 is communicated onto the DC connector 110 so that the generated DC information signal 128 is received at their receptacle connector 126. The receptacle connector 126 is configured to demodulate the received DC information signal 128 from the sensed DC voltage on the DC connector 110. The data is then modulated onto the AC voltage as the AC information signal 124. The AC information signal 124 is transferred across the customer premises AC power wiring network 104 and is detectable at the other power receptacles 118. The AC information signal 124 may be demodulated by the receptacle connectors 126 of the other client devices 108 to determine the data. Alternatively, or additionally, the host device 106 may also determine the data from the detected AC information signal 124.

Figure 2:
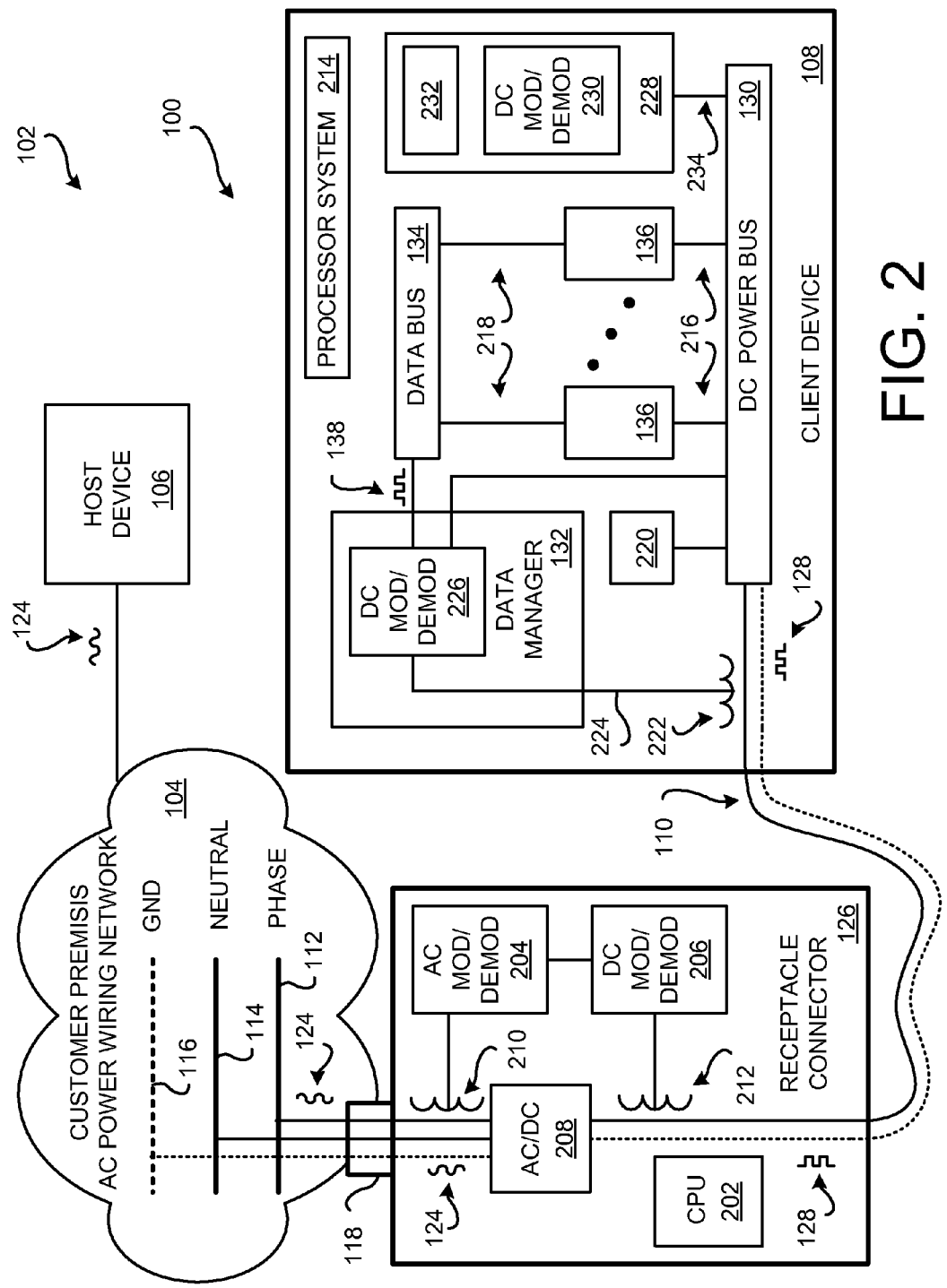
FIG. 2 is a block diagram of an embodiment of client device and its respective receptacle connector.

FIG. 2 is a block diagram of an embodiment of client device 108 and its respective receptacle connector 126. The exemplary receptacle connector 126 comprises a central processor unit (CPU) 202, an AC modulator/demodulator (MOD/DEMOD) 204, a DC modulator/demodulator (MOD/DEMOD) 206, and an AC/DC power converter (AC/DC) 208. The AC modulator/demodulator 204 is communicatively coupled to the customer premises AC power wiring network 104, in this exemplary embodiment, via a sensor 210. The DC modulator/demodulator 206 is communicatively coupled to the DC connector 110, in this exemplary embodiment, via a sensor 212.

The AC/DC power converter 208 is configured to receive AC power from the customer premises AC power wiring network 104. The AC power comprises an AC voltage and an AC current. The AC/DC power converter 208 transforms the received AC power into DC power that is input to the DC connector 110. The DC power comprises a DC voltage and a DC current. The DC voltage is substantially a constant voltage, generally at a value corresponding to the nominal DC voltage used by the client device 108. For example, the nominal DC voltage may be 12 volts DC. Since the AC voltage on the customer premises AC power wiring network 104 may vary due to various operating conditions and/or may vary as a function of the supply voltage provided from the power distribution system, the actual DC voltage may vary from the nominal voltage. So long as the actual DC voltage is within some predefined DC voltage tolerance range of the nominal DC voltage, for example +/−10%, the client device 108 will properly operate for its intended function.

When the receptacle connector 126 is receiving the power from the customer premises AC power wiring network 104, the AC modulator/demodulator 204 detects the AC information signal 124 that has been modulated onto the AC voltage of the customer premises AC power wiring network 104 may also be detected. The data may be determined by demodulating the AC information signal 124.

The DC modulator/demodulator 206 is configured to modulate the data onto the DC voltage provided by the AC/DC power converter 208. For example, the data may correspond to a series of binary data bits or the like. The DC modulator/demodulator 206 may be configured to increase (pull up) the DC voltage by some predefined amount to represent a first binary value (e.g., "1"). Thus, when the DC voltage is not being pulled up, the unmodulated DC voltage corresponds to the second binary value (e.g., "0"). In some embodiments, the DC modulator/demodulator 206 may be configured to decrease (pull down) the DC voltage by some predefined amount to represent a second binary value. Some embodiments may modulate by both pulling up and pulling down the DC voltage. Accordingly, the DC voltage that is transmitted to the client device 108 over the DC connector 110 is modulated to comprise the data that has been demodulated from the AC voltage of the customer premises AC power wiring network 104. In an exemplary embodiment, the pull up DC voltage and/or the pull down DC voltage may vary by some predefined range, such as +/−5% of the nominal DC voltage value. Any suitable pull up DC voltage and/or the pull down DC voltage, or voltage range, may be used by the various embodiments.

In another embodiment, the DC modulator/demodulator 206 is configured to modulate an AC voltage onto the DC voltage provided by the AC/DC power converter 208. generally, the magnitude of the AC voltage that is modulated onto the DC voltage is relatively small, such as within the DC voltage tolerance range of the DC voltage provided by the AC/DC power converter 208. A phase inversion of the AC voltage is used to indicate the data.

In the various embodiments, the source device (the host device 106 or the client device 108) that is originating the AC information signal 124 may use an identifier to identify a destination client device 108 for which the AC information signal 124 is intended to be received by. The identifier is included as part of the data of the AC information signal 124. In an exemplary embodiment, the CPU 202 monitors the data to determine if the identifier in the demodulated AC information signal 124 corresponds to a device identifier of its respective client device 108. When the identifier in the demodulated AC information signal 124 corresponds to the device identifier of its respective client device 108, the CPU 202 operates the DC modulator/demodulator 206 so that the data is modulated onto the DC voltage provided by the AC/DC power converter 208. Data associated with a different identifier is not modulated onto the DC connector 110. Thus, data not intended for that particular client device 108 may be otherwise ignored.

In other embodiments, all detected data on the AC voltage provided over the customer premises AC power wiring network 104 is demodulated and then modulated onto the DC voltage provided by the AC/DC power converter 208. That is, all data is demodulated/modulated by the DC modulator/demodulator 206 and is communicated to the client device 108 via the DC connector 110. The client device 108 detects the data and the identifier on the modulated DC voltage, and then selectively operates based on the received data when the identifier corresponds to its device identifier. Thus, data not intended for that particular client device 108 may be otherwise ignored.

The exemplary embodiment of the client device 108 comprises the DC power bus 130, the data manager 132, the data bus 134, a processor system 214, and a plurality of components 136 that are configured to receive DC power from the DC power bus 130, via connectors 216, and to receive data from the data bus 134, via connectors 218. Other components 220 may be included that are configured to perform various functions using DC power from the DC power bus 130. However, the components 220 do not require data from the data bus 134 for their operation.

The DC power bus 130 is coupled to the DC connector 110 such that the DC voltage is available to power the various components of the client device 108. Other power conditioning components (not shown) may be used in some embodiments of the client device 108 and/or the receptacle connector 126 so they provide improved power quality. For example, filters or the like may be used to filter the DC voltage such that power received from the customer premises AC power wiring network 104 is improved by filtering out undesirable characteristics.

The data manager 132 is configured to receive the data modulated onto the DC voltage that is provided over the DC connector 110. In the exemplary client device 108, a detector 222 is in proximity to the DC connector 110 and/or the DC power bus 130 to detect the DC voltage. The detected DC voltage is provided to the data manager 132, via connection 224.

The exemplary data manager 132 may comprise a DC modulator/demodulator (DC MOD/DEMOD) 226 that is configured to demodulate the DC data from the detected modulated DC voltage. The DC modulator/demodulator 226 communicates the data onto the data bus 134 and/or directly to selected components. The components 136 may then operate in accordance with the data.

In embodiments wherein the data includes an identifier that identifies a destination device, the processor system 214 is configured to detect the identifier associated with the received data. The processor system 214 may operate the DC modulator/demodulator 226 so that the data is available when the identifier in the demodulated DC information signal 128 corresponds to the identifier of the client device 108. Accordingly, the client device 108 may selectively operate based on the received data. Thus, data not intended for that particular client device 108 may be otherwise ignored.

Some embodiments of the client device 108 may include a sub-system 228 that is configured to receive data directly from the DC power bus 130 (or the DC connector 110). The sub-system 228 comprises its own DC modulator/demodulator 230 and one or more components 232 that are controlled by the sub-system 228. Thus, both DC power and the data of the DC information signal 128 is receivable over a single connector 234. Alternative embodiments of the sub-system 228 may comprise other components (not shown).

In some embodiments, the client device 108 may be configured to generate data that is communicated to the host device 106 and/or to other client devices 108. In such embodiments, the DC modulator/demodulator 226 is configured to receive the data from the data bus 134, and/or directly from a component of the client device 108. The DC modulator/demodulator 226 modulates the data and communicates the modulated data onto the DC connector 110 and/or the DC power bus 130 as a DC information signal 128. The DC information signal 128 is received at the receptacle connector 126 via the DC connector 110. The DC modulator/demodulator 206 then demodulates the data from the received DC information signal 128. The data is then communicated to the AC modulator/demodulator 204. The AC modulator/demodulator 204 modulates the data onto the AC voltage as an AC information signal 124 that is communicated onto the customer premises AC power wiring network 104. The AC information signal 124 is then detectable by the host device 106 and/or other client devices 108.

Some embodiments of the receptacle connector 126 may be configured to generate and communicate calibration data over the DC connector 110 to the client device 108 such that the receiving client device 108 can perform a signal calibration. Similarly, some embodiments of the client device 108 may be configured to generate and communicate calibration data over the DC connector 110 to the receptacle connector 126 such that the receiving receptacle connector 126 can perform a signal calibration. Since the DC voltage generated by the AC/DC power converter 208 may vary about the nominal DC voltage, the calibration signal may be used to better indicate the actual real time characteristics of the DC information signal 128 that is communicated over the DC connector 110.

For example, if the AC/DC power converter 208 provides a nominal DC output voltage of 12 volts DC, the actual output voltage may range between 10.8 volts DC and 13.2 volts DC (that is, +/−10% of the nominal DC voltage). If the DC modulator/demodulator 206 is configured to adjust the DC voltage output by the receptacle connector 126 by 0.5 volts DC, if the real time DC voltage output from the AC/DC power converter 208 is 13.2 volts, then the DC information signal 128 may range between 13.2 volts to 13.7 volts (by increasing the output voltage from the AC/DC power converter 208 by 0.5 volts DC). After calibration, the data manager 132 would be calibrated to more reliably detect the received DC voltages at 13.2 volts and 13.7 volts (or some corresponding DC voltage value after an inherent voltage drop that occurs due to the impedance of the DC connector 110) to determine the communicated data.

At some later time, if some condition occurs back on the customer premises AC power wiring network 104 to change the value of the AC supply voltage, then the value of the DC voltage output from the AC/DC power converter 208 would change by a corresponding amount. Thus, the voltages of the DC information signal 128 will change. The periodic recalibration between the client device 108 and its respective receptacle connector 126 would ensure that the 0.5 volts DC modulated onto the DC voltage would be recognized as data by the client device 108.

Alternatively, or additionally, some embodiments may employ a DC power system wherein the output voltage from the AC/DC power converter 208 is substantially greater than the nominal voltage used by the client device 108. The higher voltage of the DC information signal 128 on the DC connector 110 would result in an improved signal to noise ratio for the DC information signal 128. A voltage reducing component (not shown) at the client device 108 would reduce the received higher DC voltage down to the nominal DC voltage used by the client device 108. For example, if the nominal DC voltage of the client device 108 was 12 volts DC, an exemplary AC/DC power converter 208 may provide an output voltage of two times the nominal DC voltage, that is, 24 volts DC. If the DC modulator/demodulator 206 is configured to modulate the DC voltage by +5%, then the DC voltage of the AC information signal 124 could vary by 1.2 volts DC, for example. A voltage variation of 1.2 volts could be detected by the data manager 132 with greater reliability. The received actual DC voltage, corresponding to the output 24 volts DC from the AC/DC power converter 208, would be reduced by the voltage reducing component by 50%, so that the operating DC voltage corresponds to the nominal 12 volts DC used by the client device 108.

The above-described components of the client device 108 and/or the receptacle connector 126 may be implemented using any suitable combination of firmware, software, or a combination of firmware and software. The components of the client device 108 and/or the receptacle connector 126 may comprise separate components, and/or some components may be integrated together into a single component. Other client devices 108 and/or receptacle connectors 126 may include some, or may omit some, of the above-described components. For example, the processor system 214 and/or the CPU 202 may be implemented as a general purpose computing device, or may be implemented as a special purpose computing device. Further, additional components not described herein may be included in alternative embodiments.

Figure 3:
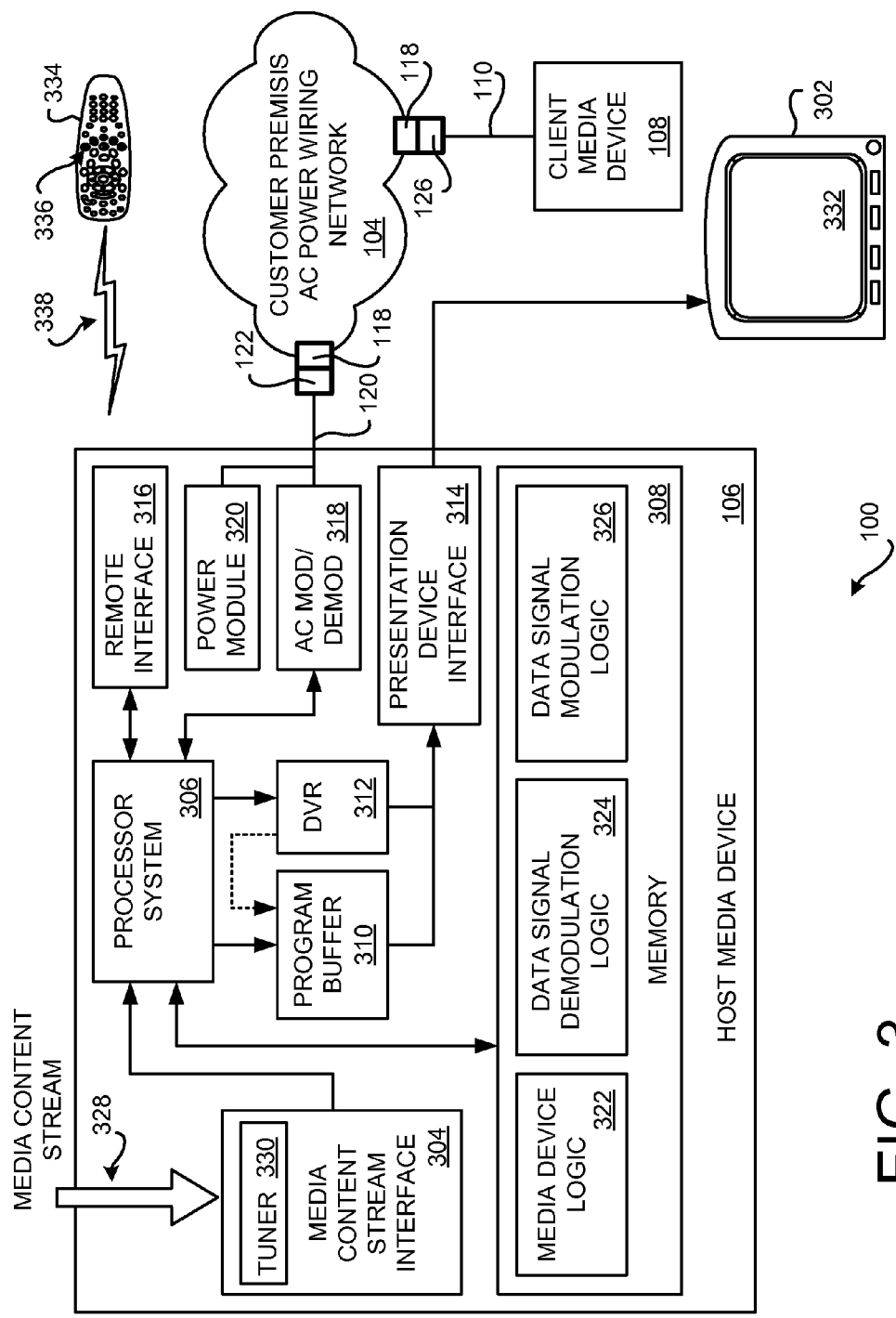
FIG. 3 is a block diagram of an exemplary host media device and an exemplary client media device.

FIG. 3 is a block diagram of an exemplary host media device 106. The host media device 106 may be configured to communicate media content for presentation to a media presentation device 302. Non-limiting examples of the exemplary host media device 106 include set top boxes (STBs), stereos, surround-sound receivers, radios, televisions (TVs), digital video disc (DVD) players, digital video recorders (DVRs), cellular phones equipped with video functionality, personal device assistants (PDAs), game playing devices, or personal computers (PCs).

The non-limiting exemplary host media device 106 comprises a media content stream interface 304, a processor system 306, a memory 308, a program buffer 310, an optional digital video recorder (DVR) 312, a presentation device interface 314, a remote interface 316, an AC modulator/demodulator (AC MOD/DEMOD) 318 and a power module 320. The memory 308 comprises portions for storing the media device logic 322, the data signal demodulation logic 324, and the data signal modulation logic 326. In some embodiments, the media device logic 322, the data signal demodulation logic 324, and the data signal modulation logic 326 may be integrated together, and/or may be integrated with other logic. In other embodiments, some or all of these memory and other data manipulation functions may be provided by and using a remote server or other electronic devices suitably connected via the Internet or otherwise to a client. Other media devices may include some, or may omit some, of the above-described media processing components. Further, additional components not described herein may be included in alternative embodiments.

The functionality of the host media device 106, here a set top box, is now broadly described. The power module 320 is coupled to the customer premises AC power wiring network 104. The power module 320 receives AC power from the customer premises AC power wiring network 104 and conditions the received AC power into DC power and/or AC power that is used by the host media device 106.

A media content provider provides program content that is received in one or more multiple media content streams 328 multiplexed together in one or more transport channels. The transport channels with the media content streams 328 are communicated to the host media device 106 from a media system sourced from a remote head end facility (not shown) operated by the media content provider. Non-limiting examples of such media systems include satellite systems, cable system, and the Internet. For example, if the media content provider provides programming via a satellite-based communication system, the host media device 106 is configured to receive one or more broadcasted satellite signals detected by an antenna (not shown). Alternatively, or additionally, the media content stream 328 can be received from one or more different sources, such as, but not limited to, a cable system, a radio frequency (RF) communication system, or the Internet.

The one or more media content streams 328 are received by the media content stream interface 304. One or more tuners 330 in the media content stream interface 304 selectively tune to one of the media content streams 328 in accordance with instructions received from the processor system 306. The processor system 306, executing the video media device logic 322, and based upon a request for a media content event of interest specified by a user, parses out the media content event of interest from the media content stream 328. The media content event of interest is then assembled into a stream of video and/or audio information which may be stored by the program buffer 310 such that the media content event content can be streamed out to the media presentation device 302, such as, but not limited to the illustrated television, via the presentation device interface 314. Alternatively, or additionally, the parsed out media content event may be saved into the DVR 312 for later presentation. The DVR 312 may be directly provided in, locally connected to, or remotely connected to, the host media device 106.

In this simplified embodiment, the presentation device interface 314 is illustrated as coupled to a media presentation device 302 that includes a visual display 332. The video portion of the streamed media content event is displayed on the display 332 and the audio portion of the streamed media content is reproduced as sounds by one or more speakers (not shown).

The exemplary host media device 106 is configured to receive commands from a user via a remote control 334. The remote control 334 includes one or more controllers 336. The user, by actuating one or more of the controllers 336, causes the remote control 334 to generate and transmit commands, via a wireless signal 338, to the host media device 106. The commands may be configured to control the host media device 106 and/or control the media presentation device 302. The wireless signal 338 may be an infrared signal or an RF signal.

At times, the host media device 106 may be operated to communicate the media content stream 328, the specified media content event, and/or other commands to the client media device 108. Information corresponding to the media content stream 328, the specified media content event, and/or the other commands is modulated and communicated onto the customer premises AC power wiring network 104 as the AC information signal 124. The information is communicated from the AC modulator/demodulator 318 onto the customer premises AC power wiring network 104. The modulation may be performed under the control of the processor system 306 executing the data signal modulation logic 326.

In some embodiments, the client media device 108 may need to communicate information and/or commands to the host media device 106. For example, but not limited to, the client media device 108, located in another area of the customer premises 102 and coupled to another media presentation device 302, may communicate information that is used to configure the tuner 330 to receive a media content stream 328 having a media content event that will be communicated from the client media device 108 to its respective media presentation device 302. Accordingly, the information corresponding to the command may be detected in the AC information signal 124 at the AC modulator/demodulator 318. The data may be received and interpreted by the processor system 306 executing the data signal demodulation logic 324.

Figure 4:
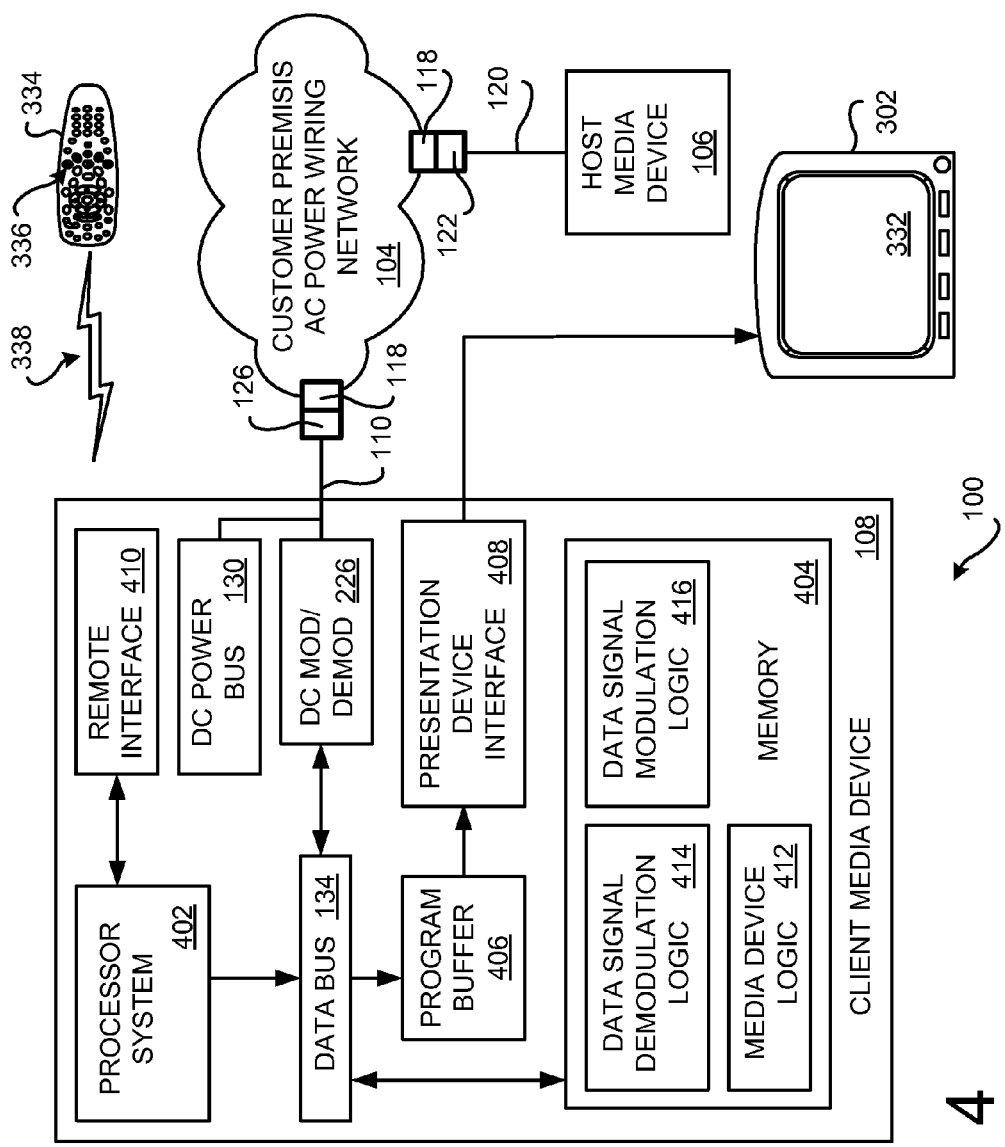
FIG. 4 is a block diagram of an exemplary client media device.

FIG. 4 is a block diagram of an exemplary client media device 108. The exemplary client media device 108 is configured to operate on DC power.

The client media device 108 may be configured to receive the media content stream 328, the specified media content event, and/or other commands from the host media device 106 for presentation to another media presentation device 302. The exemplary client media device 108 comprises the DC power bus 130, the data manager 132, the data bus 134, a processor system 214, and a plurality of components. For example, the client media device 108 further comprises a processor system 402, a memory 404, a program buffer 406, a presentation device interface 408, and a remote interface 410. The memory 404 comprises portions for storing the media device logic 412, the data signal demodulation logic 414, and the data signal modulation logic 416. In some embodiments, the media device logic 412, the data signal demodulation logic 414, and the data signal modulation logic 416 may be integrated together, and/or may be integrated with other logic. In other embodiments, some or all of these memory and other data manipulation functions may be provided by and using a remote server or other electronic devices suitably connected via the Internet or otherwise to a client. Other media devices may include some, or may omit some, of the above-described media processing components. Further, additional components not described herein may be included in alternative embodiments.

The client media device 108 may be operated to receive the media content stream 328, the specified media content event, and/or other commands from the host media device 106. Information corresponding to the media content stream 328, the specified media content event, and/or the other commands is received on the AC information signal 124. The information is detected by the DC modulator/demodulator 226. The demodulation may be performed under the control of the processor system 402 executing the data signal demodulation logic 414.

The exemplary client media device 108 is also configured to receive commands from a user via the remote control 334. The user, by actuating one or more of the controllers 336, causes the remote control 334 to generate and transmit commands to the client media device 108. The commands may be configured to control the host media device 106 and/or control the media presentation device 302.

When the client media device 108 communicates information and/or commands to the host media device 106, the information and/or commands may be communicated as a AC information signal 124 via the DC modulator/demodulator 226. The data may be processed by the processor system 402 executing the data signal modulation logic 416.

One or more of the components used by the host media device 106 may be omitted from the client media device 108. For example, the media content stream interface 304 and the tuner 330 are not required since the client media device 108 does not receive the media content stream 328 from the media system. In some embodiments, the DVR 312 may be omitted since the recording of media content may be performed by the exemplary host media device 106.

Other components of the client media device 108 may have a lower cost as compared to similar components of the host media device 106. For example, the processor system 402 may require less processing capacity and/or less processing speed than the processor system 306 of the host media device 106 (FIG. 3) since the received media content event has already been parsed out from the media content stream 328. The media device logic 412 may also be less complex, and thus require less storage capacity on the memory 404 than that of the similar media device logic 322 of the host media device 106. The cost of the DC power system is typically less than the cost of the power module 320 of the host media device 106 since the power module must convert AC power received from the customer premises AC power wiring network 104. Since the client media device 108 is a low DC voltage device, the cost of the chassis and other components may be less than that of the host media device 106 since the host media device 106 is coupled to a higher AC voltage.

Since the client media device 108 is configured to receive the media content stream 328, the specified media content event, and/or other commands over the customer premises AC power wiring network 104, the client media device 108 has the unexpected advantage of less cost, less power operating costs, and/or fewer components than the host media device 106. It should be emphasized that the above-described embodiments of the DC data communication system 100 are merely possible examples of implementations of the invention. Many variations and modifications may be made to the above-described embodiments. All such modifications and variations are intended to be included herein within the scope of this disclosure and protected by the following claims.

The invention claimed is:

1. An apparatus, comprising:
   a connector configured to electrically couple to a receptacle of an alternating current (AC) power wiring network,
      wherein AC power available from the AC power wiring network is defined by an AC voltage and an AC current,
      wherein the AC power is drawn from the AC power wiring network by the apparatus to provide DC power to an electronic device that is coupled to the apparatus, and
      wherein the AC power includes an AC information signal modulated thereon as a modulation of the AC voltage;
   an AC to DC power converter coupled to the connector, wherein the AC to DC power converter is configured to:
      receive the AC power from the AC power wiring network;
      convert the AC power into the DC power, wherein the DC power is defined by a DC voltage and a DC current; and
      output the DC power onto a DC connector that couples the apparatus to the electronic device;
   an AC modulator/demodulator communicatively coupled to the connector, wherein the AC modulator/demodulator is configured to:
      detect the AC voltage of the received AC power;
      demodulate the AC information signal to determine information, wherein the information is determined based on detected changes in the AC voltage that correspond to the AC information signal; and
      output the determined information; and
   a DC modulator/demodulator coupled to the AC modulator/demodulator and the DC connector, wherein the DC modulator/demodulator is configured to:
      receive the information from the AC modulator/demodulator; and
      modulate the received information into a DC information signal onto the DC power,
         wherein the DC information signal comprises a series of first binary numbers and second binary numbers,
         wherein each first binary number is defined by a pull up DC voltage, and
         wherein each second binary number is defined by a pull down DC voltage,
      wherein the pull up DC voltage increases the DC voltage that is output from the AC to DC power converter to a pull up DC voltage value,
      wherein the pull down DC voltage decreases the DC voltage that is output from the AC to DC power converter to a pull down DC voltage value, and
      wherein a difference between the pull up DC voltage value and the pull down DC voltage value corresponds to at least a predefined percentage change.

2. The apparatus of claim 1, wherein the AC information signal includes at least one of a plurality of unique identifiers, and wherein a first one of the plurality of unique identifiers is associated with the electronic device that is coupled to the apparatus, the apparatus further comprising:
   a central processor unit (CPU) controllably coupled to the DC modulator/demodulator, wherein the CPU is configured to:
      determine an identifier in the demodulated information, and
      operate the DC modulator/demodulator so that the information is modulated into the DC information signal only when the identifier corresponds to the first one of the plurality of unique identifiers that is associated with the electronic device.

3. The apparatus of claim 2, wherein the DC modulator/demodulator is not operated when the identifier corresponds to another of the plurality of unique identifiers.

4. The apparatus of claim 1, wherein a host device that is coupled to the AC power wiring network generates the AC information signal.

5. The apparatus of claim 1, wherein the output DC voltage is defined with respect to a predefined nominal DC voltage, and wherein the difference between the pull up DC voltage value and the pull down DC voltage value corresponds to at least a predefined percentage change of the nominal DC voltage.

6. The apparatus of claim 1,
   wherein the AC information signal modulated onto the AC power as a modulation of the AC voltage is first AC information,
   wherein the information is first information defined by a first series of the first binary numbers and the second binary numbers,
   wherein the DC modulator/demodulator is further configured to:
      detect changes in the DC voltage that are caused by the electronic device that is coupled to the apparatus;
      determine second information based on the detected changes in the DC voltage; and
      output the determined second information to the AC modulator/demodulator, and
   wherein the AC modulator/demodulator is further configured to:
      receive the second information from the DC modulator/demodulator, and
      modulate a second AC information signal onto the AC power by a modulation of the AC voltage.

7. The apparatus of claim 6, wherein a host device that is coupled to the AC power wiring network generates the first AC information signal, and wherein the host device receives the second AC information that has been modulated onto the AC voltage.

8. The apparatus of claim 6,
   wherein the electronic device is a first electronic device,
   wherein a second electronic device is coupled to another apparatus and is configured to operate on DC power provided by the other apparatus,
   wherein the other apparatus is coupled to the AC power wiring network,
   wherein the other apparatus receives the second AC information that has been modulated onto the AC voltage, and wherein the other apparatus communicates second information to the second electronic device that corresponds to the second AC information.

9. An electronic device configured to operate using direct current (DC) power defined by a DC voltage and a DC current, and configured to operate in accordance with first information received from a host electronic device, the electronic device comprising:
 a DC power bus configured to electrically couple to a receptacle connector, wherein the receptacle connector provides the DC power that includes the first information modulated onto the DC voltage,
 wherein the first information is defined by a first series of first binary numbers and second binary numbers,
 wherein each first binary number is defined by a pull up DC voltage, and
 wherein each second binary number is defined by a pull down DC voltage;
 a DC modulator/demodulator coupled to the DC power bus, wherein the DC modulator/demodulator is configured to:
  detect the DC voltage of the received DC power; and
  output the first series of the first binary numbers and the second binary numbers based on detected changes in the DC voltage,
  wherein a transition from the first binary number to the second binary number is determined when the detected change in the DC voltage corresponds to a percentage decrease in the DC voltage that is at least equal to a predefined percentage change, and
  wherein a transition from the second binary number to the first binary number is determined when the detected change in the DC voltage corresponds to the percentage increase in the DC voltage that is at least equal to the predefined percentage change; and
 a processor system communicatively coupled to the DC modulator/demodulator, wherein the processor system controls operation of the electronic device in accordance with the information defined by the series of the first binary numbers and the second binary numbers,
 wherein the electronic device operates in accordance with the first information defined by the first series of the first binary numbers and the second binary numbers,
 wherein the processor system is further configured to:
  define second information as a second series of the first binary numbers and the second binary numbers, and
  communicate the second series of the first binary numbers and the second binary numbers to the DC modulator/demodulator,
 wherein the DC modulator/demodulator is further configured to:
  modulate the received second information into a DC information signal onto the DC power by increasing the DC voltage by a pull up DC voltage value to represent the first binary number,
  modulate the received second information into the DC information signal onto the DC power by decreasing the DC voltage by a pull down DC voltage value to represent the second binary number, and
  wherein a difference between the pull up DC voltage value and the pull down DC voltage value corresponds to at least the predefined percentage change,
 wherein the DC information signal is detected by the receptacle connector, and
 wherein the second information is output by the receptacle connector onto an AC power wiring network.

10. The electronic device of claim 9, wherein the first information includes at least one of a plurality of unique identifiers, and wherein a first one of the plurality of unique identifiers is associated with the electronic device, wherein the processor system is further configured to:
 determine the at least one identifier in the first information; and
 operate the electronic device in accordance with the first information only when the identifier corresponds to the first one of the plurality of unique identifiers associated with the electronic device,
 wherein the electronic device is not operated when the identifier corresponds to another of the plurality of unique identifiers.

11. The electronic device of claim 9, wherein the host electronic device receives the second information via the AC power wiring network.

12. The electronic device of claim 9, further comprising:
 at least one component, wherein operation of the component is controllable based on the first series of the first binary numbers and the second binary numbers; and
 a data bus communicatively coupled to the DC modulator/demodulator and the at least one component,
 wherein the data bus is configured to communicate the first series of the first binary numbers and the second binary numbers to the at least one component, and wherein the at least one component operates in accordance with the first series of the first binary numbers and the second binary numbers.

13. The electronic device of claim 9, further comprising:
 a media content stream interface configured to receive a media content stream that has at least one media content event therein; and
 a presentation device interface communicatively coupled to the media content stream interface and a media presentation device,
 wherein the media content event received in the media content stream is communicated to the media presentation device via the presentation device interface for presentation to a user, and
 wherein presentation of the media content event is controlled by the first information.

14. A communication system that communicates information over an alternate current (AC) power wiring network to a plurality of direct current (DC) powered client devices coupled to the AC power wiring network via a power receptacle, the communication system comprising:
 a host device, comprising:
  a power module configured to receive alternating current (AC) power from the AC power wiring network via an AC power connector, wherein the AC power is defined by an AC voltage and an AC current;
  a processor system configured to define information as a series of first binary numbers and second binary numbers, wherein the information is configured to control operation of at least one of the plurality of DC powered client devices; and
  a DC modulator/demodulator coupled to the processor system and the AC power connector, wherein the DC modulator/demodulator is configured to:
   receive the information from the processor system; and
   modulate the AC voltage by adding an AC information signal onto the AC voltage;
   wherein the AC information signal corresponds the series of the first binary numbers and the second binary numbers of the received information, wherein each first binary number corresponds to an increase in the AC voltage, and
wherein each second binary number corresponds to a decrease in the AC voltage,
a plurality of power receptacles, wherein each power receptacle is coupled to one of the plurality of DC powered client devices and comprises:
a connector configured to electrically couple to a receptacle of the alternating current (AC) power wiring network, wherein the AC power is drawn from the AC power wiring network by the apparatus to provide DC power to the respective DC powered client device that is coupled to the power receptacle;
an AC to DC power converter coupled to the connector, wherein the AC to DC power converter is configured to:
receive the AC power from the AC power wiring network;
convert the AC power into the DC power, wherein the DC power is defined by a DC voltage and a DC current; and
output the DC power onto a DC connector that couples the power receptacle to the respective DC powered client device;
an AC modulator/demodulator communicatively coupled to the connector, wherein the AC modulator/demodulator is configured to:
detect the AC voltage of the received AC power;
demodulate the AC information signal to determine information, wherein the information is determined based on detected changes in the AC voltage that corresponds to the AC information signal; and
output the determined information; and
a DC modulator/demodulator coupled to the AC modulator/demodulator and the DC connector, wherein the DC modulator/demodulator is configured to:
receive the information from the AC modulator/demodulator; and
modulate the received information into a DC information signal onto the DC power,
wherein the DC information signal comprises the series of the first binary numbers and the second binary numbers,
wherein each first binary number is defined by a pull up DC voltage, and
wherein each second binary number is defined by a pull down DC voltage,
wherein the pull up DC voltage increases the DC voltage that is output from the AC to DC power converter to a pull up DC voltage value,
wherein the pull down DC voltage decreases the DC voltage that is output from the AC to DC power converter to a pull down DC voltage value, and
wherein a difference between the pull up DC voltage value and the pull down DC voltage value corresponds to at least a predefined percentage change; and
the plurality of DC powered client devices, wherein the plurality of DC powered client devices may receive the DC information signal from the respective power receptacle that it is coupled to.

15. The communication system of claim 14, wherein each of the plurality of DC powered client devices further comprises:
a DC power bus configured to electrically couple to the respective power receptacle connector;
a DC modulator/demodulator coupled to the DC power bus, wherein the DC modulator/demodulator is configured to:
detect the DC voltage of the received DC power; and
output the series of the first binary numbers and the second binary numbers based on detected changes in the DC voltage,
wherein a transition from the first binary number to the second binary number is determined when the detected change in the DC voltage corresponds to a percentage decrease in the DC voltage that is at least equal to a predefined percentage change, and
wherein a transition from the second binary number to the first binary number is determined when the detected change in the DC voltage corresponds to a percentage increase in the DC voltage that is at least equal to the predefined percentage change,
wherein the DC powered client device operates in accordance with information defined by the series of the first binary numbers and the second binary numbers.

16. The communication system of claim 15, wherein at least one of the plurality of DC powered client devices further comprises:
a media content stream interface configured to receive a media content stream that has at least one media content event therein; and
a presentation device interface communicatively coupled to the media content stream interface and a media presentation device,
wherein the media content event received in the media content stream is communicated to the media presentation device via the presentation device interface for presentation to a user, and
wherein presentation of the media content event is controlled by the information.

17. The communication system of claim 14, wherein the AC information signal includes at least one of a plurality of unique identifiers, and wherein a first one of the plurality of unique identifiers is associated with one of the plurality of DC powered client devices, each of the power receptacles further comprising:
a central processor unit (CPU) controllably coupled to the DC modulator/demodulator, wherein the CPU is configured to:
determine the identifier in the demodulated information, and
operate the DC modulator/demodulator so that the information is modulated into the DC information signal only when the identifier corresponds to the first one of the plurality of unique identifiers that is associated with the electronic device.

* * * * *